United States Patent
Balabin et al.

(10) Patent No.: US 11,908,193 B2
(45) Date of Patent: Feb. 20, 2024

(54) OBTAINING CUSTOM ARTIFICIAL NEURAL NETWORK ARCHITECTURES

(71) Applicant: Blaize, Inc., El Dorado Hills, CA (US)

(72) Inventors: Ilya A. Balabin, Morrisville, NC (US);
Adam P. Geringer, Raleigh, NC (US);
Dmitry Zakharchenko, Cary, NC (US)

(73) Assignee: Blaize, Inc., El Dorado Hills, CA (US)

( * ) Notice: Subject to any disclaimer, the term of this patent is extended or adjusted under 35 U.S.C. 154(b) by 736 days.

(21) Appl. No.: 17/097,249

(22) Filed: Nov. 13, 2020

(65) Prior Publication Data

US 2021/0326712 A1 Oct. 21, 2021

Related U.S. Application Data

(60) Provisional application No. 63/011,408, filed on Apr. 17, 2020.

(51) Int. Cl.
*G06N 3/084* (2023.01)
*G06N 5/046* (2023.01)
(Continued)

(52) U.S. Cl.
CPC ............ *G06V 20/46* (2022.01); *G06F 18/217* (2023.01); *G06F 18/22* (2023.01); *G06F 18/285* (2023.01);
(Continued)

(58) Field of Classification Search
CPC .......... G06N 3/045; G06N 3/08; G06N 3/082; G06N 3/084; G06N 3/044; G06N 3/086;
(Continued)

(56) References Cited

U.S. PATENT DOCUMENTS 9,015,093 B1 4/2015 Commons
2018/0181503 A1* 6/2018 Nicol .................. G06F 13/1673

OTHER PUBLICATIONS

"Reconfigurable Network for Efficient Inferencing in Autonomous Vehicles" 2019 International Conference on Robotics and Automation (ICRA) Palais des congres de Montreal, Montreal, Canada, May 20-24, 2019 Shihong Fang* and Anna Choromanska* (Year: 2019).*

(Continued)

*Primary Examiner* — Luis A Sitiriche
(74) *Attorney, Agent, or Firm* — Brian R. Short (57) ABSTRACT

Methods, systems and apparatuses for a custom artificial neural network (ANN) architecture are disclosed. One method includes selecting existing ANN architectures, calculating ANN architecture fingerprints, calculating ANN architecture pairwise similarities among the existing ANN architectures, calculating centrality scores for the existing ANN architectures using the ANN architecture pairwise similarities, calculating dataset pairwise similarities between the target dataset and each of the existing datasets using dataset fingerprints, calculating target performance scores for the existing ANN architectures on the target dataset using performance scores of the existing ANN architectures on the existing datasets and the dataset pairwise similarities, calculating interpolation weights for the existing ANN architectures using the target performance scores of the existing ANN architectures on the target dataset and the centrality scores, and obtaining the custom ANN architecture by interpolating among the existing ANN architectures using the calculated interpolation weights.

20 Claims, 5 Drawing Sheets

(51) Int. Cl.
  *G06V 20/40* (2022.01)
  *G06V 40/12* (2022.01)
  *G06F 18/22* (2023.01)
  *G06F 18/21* (2023.01)
  *G06F 18/20* (2023.01)
  *G06V 10/764* (2022.01)
  *G06V 10/82* (2022.01)

(52) U.S. Cl.
  CPC ............. *G06N 3/084* (2013.01); *G06N 5/046* (2013.01); *G06V 10/764* (2022.01); *G06V 10/82* (2022.01); *G06V 40/1365* (2022.01)

(58) Field of Classification Search
  CPC .. G06N 5/01; G06N 3/04; G06N 7/01; G06N 3/006; G06N 3/063; G06N 20/00; G06N 3/047; G06N 3/048; G06N 3/098; G06N 3/0464; G06N 3/049; G06N 3/096; G06N 20/20; G06N 3/02; G06N 3/0442; G06N 3/0463; G06N 3/0985; G06N 3/105; G06N 3/126; G06N 5/046; G06N 3/0455; G06N 3/06; G06N 3/088; G06N 3/0895; G06N 5/02; G06F 18/2148; G06F 18/217; G06F 18/28; G06F 18/40; G06F 18/22; G06F 18/285; G06F 16/3347; G06F 16/338; G06F 16/35; G06F 2207/4824; G06F 40/274; G06F 40/58; G06F 7/24; G06F 7/48; G06F 7/58; G06F 16/9535; G06F 18/10; G06F 18/214; G06F 2117/04; G06F 2117/08; G06F 2119/06; G06F 30/27; G06F 30/39; G06F 9/3004
  See application file for complete search history.

(56) References Cited

OTHER PUBLICATIONS

Neural Architecture Search: A Survey, Thomas Elsken, Jan Hendrik Metzen, Frank Hutter, Journal of Machine Learning Research 20 (2019) 1-21, Submitted Sep. 18; Revised Mar. 2019; Published Mar. 2019.

Regularized Evolution for Image Classifier Architecture Search, Esteban Real, Alok Aggarwaly, Yanping Huangy, Quoc V. Le, Google Brain, Mountain View, California, USA, Feb. 16, 2019.

A Survey on Neural Architecture Search, Martin Wistuba, Ambrish Rawat, Tejaswini Pedapati, IBM Research AI, Jun. 18, 2019.

* cited by examiner

OBTAINING CUSTOM ARTIFICIAL NEURAL NETWORK ARCHITECTURES

RELATED APPLICATIONS

This patent application claims priority to U.S. Patent Provisional Application Ser. No. 63/011,408, filed Apr. 17, 2020, which is herein incorporated by reference.

FIELD OF THE EMBODIMENTS

The described embodiments relate generally to computer processing. More particularly, the described embodiments relate to methods, apparatuses and systems for obtaining custom artificial neural network architectures.

BACKGROUND

Artificial neural networks (ANN) are computing systems inspired by biological neural networks in human brain. ANN consist of nodes ("neurons") that are pairwise connected by vertices ("synapses"). Each node has a state characterized by a real number, usually in the range from 0.0 to 1.0, and each connection has a strength characterized by a real number. Usually, the nodes are organized in layers in such a way that no two nodes within same layer are connected, and connections only exist between nodes from different layers. The first layer is called the input layer, and the states of its nodes are set by the ANN input. The next layers are called hidden layers except the last one that is called the output layer. The states of the nodes in these layers are calculated recursively, one layer at a time: the state of each node is obtained by first calculating a sum of the states of connected nodes from the previous layers weighted by the respective connection strengths, then possibly adding a real number called bias to the sum, and finally passing the calculated sum through the activation function of the node itself. The states of the nodes in the output layer represent the result of the calculations. Hereafter, all ANN parameters other than the states of the nodes, the strengths of pairwise connections among those nodes, and the node biases are referred to as hyperparameters, to the map of the ANN layer structure and pairwise connections among its nodes as the ANN topology, and to the combination of the ANN topology and hyperparameters as the ANN architecture.

It is desirable to have a method, apparatus and system for obtaining custom artificial neural network architectures.

SUMMARY

One embodiment includes a method for obtaining a custom artificial neural network (ANN) architecture for performing an inference task on a target dataset with specified performance criteria. The method includes selecting a plurality of existing ANN architectures of a same architecture type and a plurality of existing datasets of a same data type as the target dataset, calculating a plurality of ANN architecture fingerprints including an ANN architecture fingerprint of each of the plurality of the existing ANN architectures, calculating ANN architecture pairwise similarities among the plurality of existing ANN architectures using the plurality of ANN architecture fingerprints, calculating centrality scores for the plurality of existing ANN architectures using the ANN architecture pairwise similarities, calculating dataset fingerprints including a dataset fingerprint of the target dataset and each of the plurality of existing datasets, calculating dataset pairwise similarities between the target dataset and each of the plurality of existing datasets using the dataset fingerprints, obtaining performance scores of the existing ANN architectures on the existing datasets, calculating target performance scores for the plurality of existing ANN architectures on the target dataset using the performance scores of the plurality of existing ANN architectures on the existing datasets and the dataset pairwise similarities, calculating interpolation weights for the plurality of existing ANN architectures using the target performance scores of the existing ANN architectures on the target dataset and the centrality scores calculated using the ANN pairwise similarities, and obtaining the custom ANN architecture by interpolating among the plurality of existing ANN architectures using the calculated interpolation weights.

Another embodiment includes a system for obtaining a custom artificial neural network (ANN) architecture for performing an inference task on a target dataset with specified performance criteria. The system includes a database, one or more computing devices connected through a network to the database, and memory. The memory includes instructions that, when executed by the one or more computing devices, enables the system to select a plurality of existing ANN architectures of a same architecture type and a plurality of existing datasets of a same data type as the target dataset from the database, calculate a plurality of ANN architecture fingerprints including an ANN architecture fingerprint of each of the plurality of the existing ANN architectures, calculate ANN architecture pairwise similarities among the plurality of existing ANN architectures using the plurality of ANN architecture fingerprints, calculate centrality scores for the plurality of existing ANN architectures using the ANN architecture pairwise similarities, calculate dataset fingerprints including a dataset fingerprint of the target dataset and each of the plurality of existing datasets, calculate dataset pairwise similarities between the target dataset and each of the plurality of existing datasets using the dataset fingerprints, obtain performance scores of the existing ANN architectures on the existing datasets from the database, calculate target performance scores for the plurality of existing ANN architectures on the target dataset using the performance scores of the plurality of existing ANN architectures on the existing datasets and the dataset pairwise similarities, calculate interpolation weights for the plurality of existing ANN architectures using the target performance scores of the existing ANN architectures on the target dataset and the centrality scores calculated using the ANN pairwise similarities, and obtain the custom ANN architecture by interpolating among the plurality of existing ANN architectures using the calculated interpolation weights.

Other aspects and advantages of the described embodiments will become apparent from the following detailed description, taken in conjunction with the accompanying drawings, illustrating by way of example the principles of the described embodiments.

DETAILED DESCRIPTION

The described embodiments are embodied in methods, apparatuses and systems for obtaining custom artificial neural network architectures.

In at least some implementations, in order to function, an artificial neural network (ANN) first needs to be trained by presenting a training dataset. Here, a dataset is defined as a collection of data points, where each data point characterizes an object using a mathematical description of the object structure and optionally a set of true alphanumeric, categorical, or other labels that characterize the object properties. Also, it is required that all objects described by the data points in a dataset are of a same type (e.g., audio recordings), the mathematical descriptions in all data points have same format (for example, one-dimensional time series of real numbers), and the sets of labels in all data points have same format (for example, a categorical label that defines a music genre). For example, an image dataset is a collection of data points, where each data point describes an image as an array of pixels and optionally a set of one or more labels, and each pixel is described by two coordinates that define its position within the image (usually but not necessarily the X and Y coordinates) and a set of base color intensities (usually but not necessarily RGB for red, green, and blue). For at least some embodiments datasets are considered to be of same type if the different datasets describe objects of a same type and all data points therein include a same format of mathematical description of the objects and a same format of object labels. This definition makes it possible to merge two or more datasets of same type into a single dataset.

For at least some embodiments, training an ANN consists of repeated cycles ("epochs") of forward propagation followed by backpropagation. During forward propagation, the mathematical descriptions of the objects from a training dataset, one by one, are used to set the states of the nodes in the input ANN layer. After setting the states of the input layer nodes, the states of the nodes in each subsequent layer are calculated in steps, one layer after another, as described above. The states of the nodes in the output layer represent the ANN output, for example, the label values evaluated by the ANN. During backpropagation, these values are compared with the true label values from the training set, and corrections to the pairwise connections among the ANN nodes and node biases are calculated in order to minimize the error, for example, a metric that characterizes the difference between the evaluated and true label values. Usually, the forward propagation—backpropagation cycles are repeated a specified number of times ("epochs"), or until the error decreases to a specified value, or until the error no longer decreases with each epoch. After that, all connection strengths among the nodes and all node biases are fixed and can no longer change, and the ANN can be used for evaluation or inference.

Both evaluation and inference involve a single forward propagation run in order to calculate label values for each data point in a dataset that has not been presented to the ANN during training. During evaluation, for an embodiment, the ANN performance is evaluated by comparing the calculated label values with the true ones from the dataset and thereby obtaining various accuracy metrics. During inference, for an embodiment, the dataset misses true label values, and therefore no evaluation of the ANN accuracy is performed. For example, if an ANN was trained on a dataset that consists of labelled images of cats and dogs, it can be used for inference with another dataset that consists of unlabeled cat and dog images in order to estimate which kind of animal is in each image. Hereafter, inference tasks are considered to be of same type if they are performed on datasets of a same type and produce object labels of a same type.

ANN are usually trained and evaluated on a relatively small number of datasets. For example, computer vision datasets typically include collections of images or videos and image or video labels, and computer vision ANN are usually trained and evaluated on one or a few common computer vision datasets such as MNIST, CIFAR, COCO, Cityscapes, and others. When ANN trained on some training datasets are used for inference with other datasets (hereafter named target datasets), their performance is not known in advance and could be significantly inferior to the one achieved on the training and evaluation datasets. As such, obtaining custom ANN architectures optimized for a target dataset and performance criteria remains a challenge. ANN architecture search methods attempt to address that problem by searching the ANN architecture space, but because of the very large size of that space, such searches typically require extremely large computational resources, rendering the searches slow, limited, and not always feasible.

The described embodiments address the problem by providing a process for obtaining new custom ANN architectures for performing an inference task on a specified target dataset and performance criteria, based on a weighted interpolation in the ANN architecture space among known ANN architectures. For at least some embodiments, the process involves no ANN training (other than the final custom ANN) and therefore operates much faster and requires much less computational resources compared to the conventional ANN architecture search, thereby improving optimizing the development of custom ANN.

There is a compelling need for better processes for obtaining custom ANN architectures (more accurate, faster, smaller in size), capable of running on consumer-grade computing resources rather than highly expensive top-notch GPU (graphic processing unit), TPU (tensor processing units) or (intelligence processing units), for a broad range of purposes, from developing more capable edge computing devices (such as smart video cameras) to training cutting-edge language models.

Currently, custom ANN architectures can be obtained through a network architecture search approach that requires huge computational resources (both GPU power and VRAM—video random access memory) and is therefore highly expensive. In fact, only a small number of the largest and richest AI labs in the world can afford this approach now.

The disclosed embodiments address these problems by providing an automated process of obtaining custom ANN architectures by means of interpolating among existing ANN architectures. As such, the automated process of the described embodiments eliminates a need for subjective human decisions, operates faster than human-based designs, and uses interpolating which allows for elimination of ANN training (other than the final custom ANN architecture). Therefore, the described embodiments for obtaining custom ANN architectures perform much faster than conventional NAS (network architecture search) methods that involve training of multiple transient ANN architectures, and uses much fewer computing resources than the conventional NAS methods, for the same reason.

Figure 1:
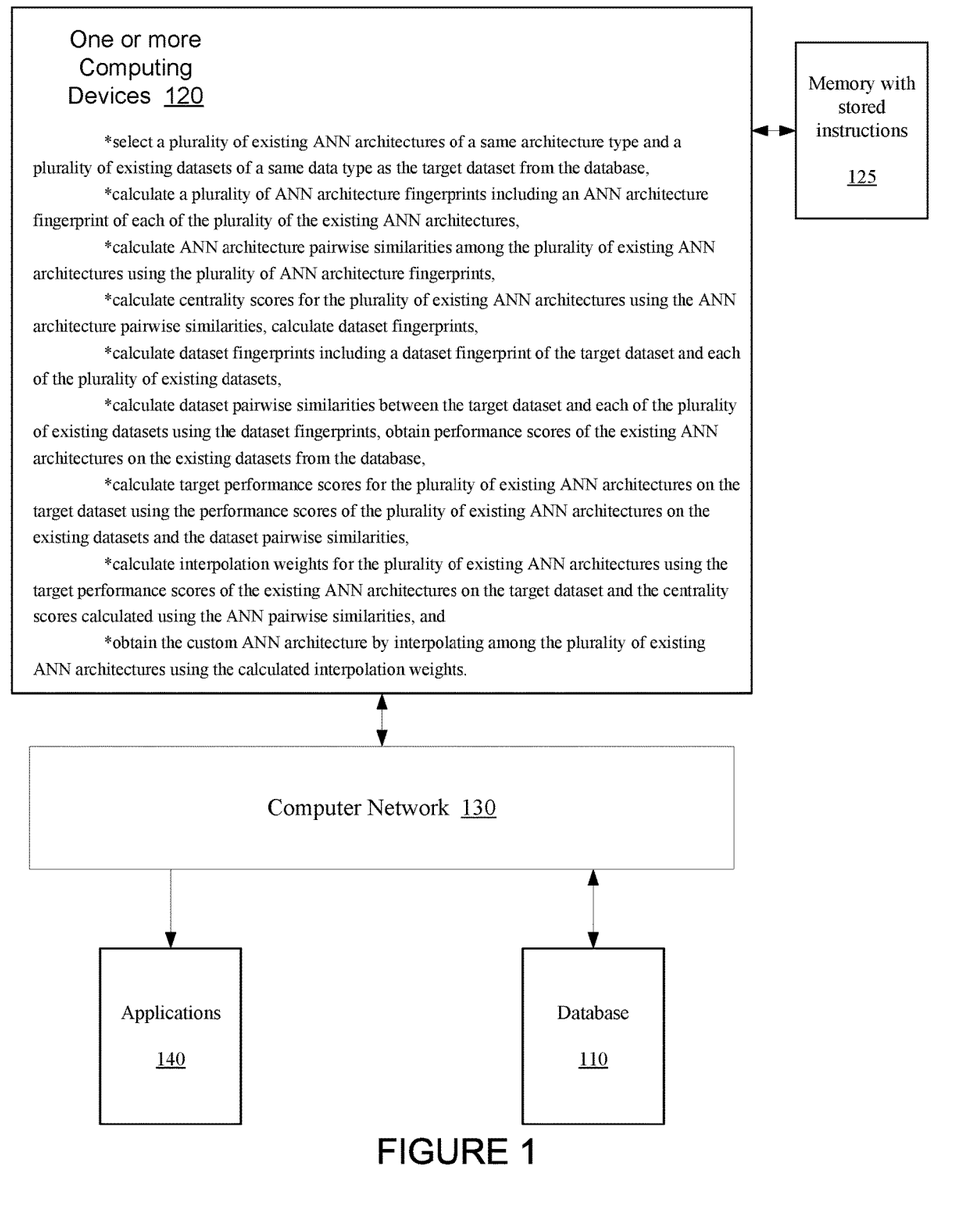
FIG. 1 shows, a system for obtaining a custom artificial neural network (ANN) architecture for performing an inference task on a target dataset with specified performance criteria, according to an embodiment.

FIG. 1 shows a system for obtaining a custom artificial neural network (ANN) architecture for performing an inference task on a target dataset with specified performance criteria, according to an embodiment. As shown, the system includes a database 110, and one or more computing devices 120 connected through a network 130 (for example, the Internet) to the database 110. The one or more computing devices 120 include memory 125. Further, an application 140 (for example, an object classification application in a smart camera such as Amazon© DeepLens or similar) can be connected to the one or more computing devices 120 in order to download and use the obtained custom ANN architecture.

For at least some embodiments, the memory 125 includes instructions that, when executed by the one or more computing devices 120, enables (or configures) the system to select a plurality of existing ANN architectures of a same architecture type as the custom artificial neural network (ANN) architecture to be obtained and a plurality of existing datasets of a same data type as the target dataset from the database, calculate a plurality of ANN architecture fingerprints including an ANN architecture fingerprint of each of the plurality of the existing ANN architectures, calculate ANN architecture pairwise similarities among the plurality of existing ANN architectures using the plurality of ANN architecture fingerprints, calculate centrality scores for the plurality of existing ANN architectures using the ANN architecture pairwise similarities, calculate dataset fingerprints including a dataset fingerprint of the target dataset and each of the plurality of existing datasets, calculate dataset pairwise similarities between the target dataset and each of the plurality of existing datasets using the dataset fingerprints, obtain performance scores of the existing ANN architectures on the existing datasets from the database, calculate target performance scores for the plurality of existing ANN architectures on the target dataset using the performance scores of the plurality of existing ANN architectures on the existing datasets and the dataset pairwise similarities, calculate interpolation weights for the plurality of existing ANN architectures using the target performance scores of the existing ANN architectures on the target dataset and the centrality scores calculated using the ANN pairwise similarities, and obtain the custom ANN architecture by interpolating among the plurality of existing ANN architectures using the calculated interpolation weights. For example, for an embodiment, in order to obtain a custom ANN architecture for image classification, convolutional ANN architectures are selected that have been used for image classification such as VGG (a convolutional neural network developed at Visual Geometric Group), ResNet (Residual Network developed at Microsoft Research), Inception (a convolutional neural network developed at Google), and similar and datasets such as ImageNet (Stanford University computer vision dataset), COCO (Common Objects in Context, Microsoft computer vision dataset), CIFAR (Canadian Institute For Advanced Research computer vision dataset), and similar that the above ANN architectures were trained and benchmarked with.

Calculating Interpolation Weights

For at least some embodiments, calculating interpolation weights for the plurality of existing ANN architectures using the target performance scores of the existing ANN architectures on the target dataset and the centrality scores calculated using the ANN pairwise similarities includes calculating a product of an estimated performance score for each of the plurality of existing ANN architectures on the target dataset and a centrality score calculated using the pairwise similarities among the plurality of existing ANN architectures. For an embodiment, the centrality score is one of the centrality scores calculated for the plurality of existing ANN architectures using the ANN architecture pairwise similarities. For an embodiment, the calculated interpolation weights are used for obtaining the ANN architecture fingerprint of the custom ANN architecture as a weighted sum of the ANN architecture fingerprints of the existing ANN architectures. For an embodiment, the custom ANN architecture is obtained from the ANN architecture fingerprint of the custom ANN architecture in a way that is inverse to calculating an ANN architecture fingerprint from an ANN architecture. Specifically, the custom ANN architecture fingerprint is obtained by performing a weighted interpolation on the ANN architecture fingerprints of the known (relevant) ANN architectures to obtain an ANN architecture fingerprint of the custom ANN architecture. The custom ANN architecture is then reconstructed from the ANN architecture fingerprint of the custom ANN architecture. For at least some embodiments, this is a straightforward process since the ANN architecture fingerprints as described are human-readable descriptions of the ANN architecture.

For at least some embodiments, the centrality score includes at least one of an ANN closeness centrality, a degree centrality, a harmonic centrality, or other centrality scores calculated using the pairwise similarities among the ANN architectures as described in network theory. For at least some embodiments, the ANN architecture centrality scores characterize, in multiple ways, how representative each ANN architecture is of the set of ANN architectures from which the centrality scores were calculated.

Calculating Target Performance Scores

For at least some embodiments, calculating performance scores for the plurality of existing ANN architectures on the target dataset using the performance scores of the plurality of existing ANN architectures on the known datasets and the dataset pairwise similarities includes interpolating among the performance scores of the plurality of existing ANN architectures on the existing datasets using the dataset pairwise similarities between the target dataset and each of the existing datasets as interpolation weights. It is to be understood that interpolating among the performance scores of the plurality of existing ANN architectures on the existing datasets using the dataset pairwise similarities between the target dataset and each of the existing datasets as interpolation weights is different than obtaining the custom ANN architecture by interpolating among the plurality of existing ANN architectures using the calculated interpolation weights.

Calculating the Dataset Pairwise Similarity

For at least some embodiments, calculating the dataset pairwise similarity between any two datasets of the target dataset and the existing datasets include calculating convolutions of two dataset fingerprints of the any two datasets with a similarity metric. For at least some embodiments, the dataset fingerprints are reduced representations of the datasets that have a simpler (for example, one-dimensional) structure and significantly fewer dimensions than the datasets and obey a similarity principle. For an embodiment, the similarity principle stipulates that the dataset fingerprints are also similar for two similar datasets, and the dataset fingerprints are significantly not similar for two significantly different datasets. For an embodiment, the similarity values calculated for fingerprints of two objects (of the same type) fall in the range between 0.0 and 1.0. Similarity values close to 1.0 indicate that the fingerprints (and therefore the objects) are quite similar, whereas similarity values close to 0.0 indicate that the fingerprints (and therefore the objects) are nearly as dissimilar as possible. For an embodiment, the dataset fingerprints are determined to be similar for two similar datasets when the similarity values are greater than a threshold value, and the dataset fingerprints are significantly not similar for two significantly different datasets when the similarity values are less than the threshold value. For example, the cosine similarity between two dataset fingerprints that are fixed-length vectors of real numbers can be calculated as a normalized dot-product of the dataset fingerprints.

Calculating the Dataset Fingerprints

For at least some embodiments, calculating the dataset fingerprints includes calculating a fixed-length real number vectors by mapping a dataset of the target dataset or anyone of the existing data sets onto a latent space of an existing ANN architecture pre-trained on one or more other datasets of a same type.

Calculating ANN Architecture Pairwise Similarities

For at least some embodiments, calculating ANN architecture pairwise similarities among the plurality of existing ANN architectures using the ANN architecture fingerprints comprises calculating convolutions of any two of the plurality of ANN architecture fingerprints with a similarity metric. For an embodiment, the similarity metric includes a generalized cosine similarity or another similarity.

For example, the pairwise similarity between ANN architectures X and Y can be calculated as $Q_{XY} = \Sigma_{key} G_{X_{key}} G_{Y_{key}} / \sqrt{(\Sigma_{key} G_{X_{key}} G_{X_{key}})(\Sigma_{key} G_{Y_{key}} G_{Y_{key}})}$, where $G_X$ and $G_Y$ are the respective ANN architecture fingerprints, the sum index runs over the set of top level keys in $G_X$ and $G_Y$, respectively, and the products of elements $G_{X_{key}}$ and $G_{Y_{key}}$ are defined as follows:

If the values $G_{X_{key}}$ and $G_{Y_{key}}$ in the two fingerprints for the same key are of different types (e.g., a tensor and a list of key-value pairs) or the value is missing in one of the fingerprints, the product is zero If the values $G_{X_{key}}$ and $G_{Y_{key}}$ in the two fingerprints for the same key are alphanumeric strings, the product is 1.0 if the strings are identical and 0.0 otherwise If the values $G_{X_{key}}$ and $G_{Y_{key}}$ in the two fingerprints for the same key are scalars, the product is $\sqrt{G_{X_{key}} G_{Y_{key}}}/(0.5 (G_{X_{key}} + G_{Y_{key}}))$ If the values $G_{X_{key}}$ and $G_{Y_{key}}$ in the two fingerprints for the same key are lists, the product is calculated using the cosine similarity If the values $G_{X_{key}}$ and $G_{Y_{key}}$ in the two fingerprints for the same key are tensors of the same order, the product is calculated using the cosine similarity and the both tensors reshaped to order 1 (1-dimensional lists). If the order of the two tensors is different, the product is zero.

If the values $G_{X_{key}}$ and $G_{Y_{key}}$ in the two fingerprints for the same key are nested sets of key-value pairs, the product is calculated by recursively applying the above formula for $Q_{XY}$ to the nested sets.

Calculating a Plurality of ANN Architecture Fingerprints

For at least some embodiments, calculating a plurality of ANN architecture fingerprints including an ANN architecture fingerprint of each of the plurality of the existing ANN architectures includes obtaining data structures that contain a complete description of an ANN topology and hyperparameters, wherein the ANN topology includes a map of an ANN layer structure and pairwise connections among nodes of the ANN layer structure.

Figure 2:
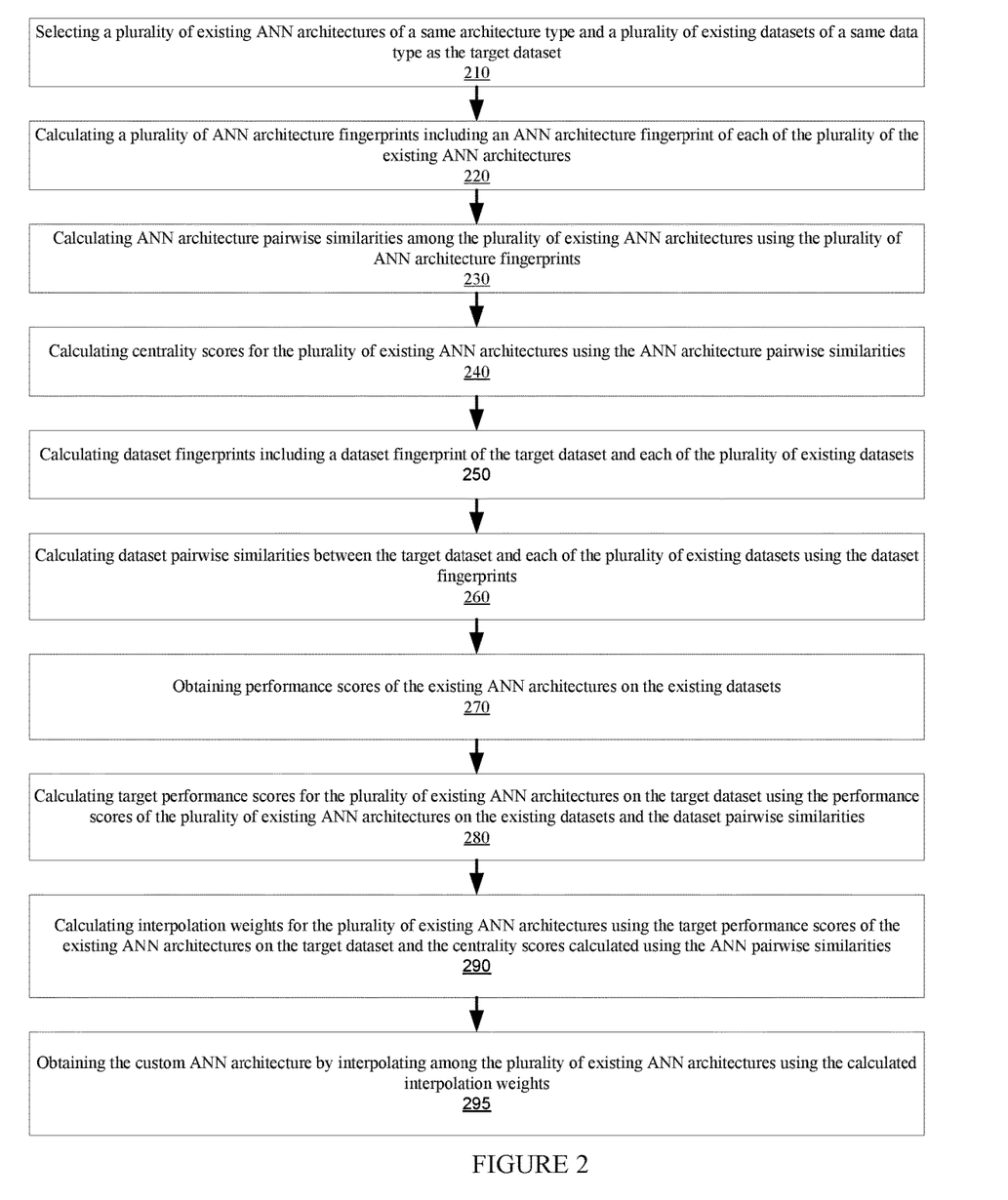
FIG. 2 is a flow chart that includes steps of a method for obtaining a custom artificial neural network (ANN) architecture for performing an inference task on a target dataset with specified performance criteria, according to an embodiment.

For an embodiment, the hyperparameters include all ANN parameters other than the states of the nodes and the strengths of pairwise connections among those nodes. For an embodiment, the hyperparameters do not include weights or biases. For an embodiment, the hyperparameters include hierarchical data structures similar to associated arrays, i.e., sets of key—value pairs where keys are alphanumeric strings and values are alphanumeric strings, scalars, lists, tensors, or nested sets of key-value pairs FIG. 2 is a flow chart that includes steps of a method for obtaining a custom artificial neural network (ANN) architecture for performing an inference task on a target dataset with specified performance criteria, according to an embodiment. A first step 210 includes selecting a plurality of existing ANN architectures of a same architecture type and a plurality of existing datasets of a same data type as the target dataset. A second step 220 includes calculating a plurality of ANN architecture fingerprints including an ANN architecture fingerprint of each of the plurality of the existing ANN architectures. A third step 230 includes calculating ANN architecture pairwise similarities among the plurality of existing ANN architectures using the plurality of ANN architecture fingerprints. A fourth step 240 includes calculating centrality scores for the plurality of existing ANN architectures using the ANN architecture pairwise similarities. A fifth step 250 includes calculating dataset fingerprints including a dataset fingerprint of the target dataset and each of the plurality of existing datasets. A sixth step 260 includes calculating dataset pairwise similarities between the target dataset and each of the plurality of existing datasets using the dataset fingerprints. A seventh step 270 includes obtaining performance scores of the existing ANN architectures on the existing datasets. An eighth step 280 includes calculating target performance scores for the plurality of existing ANN architectures on the target dataset using the performance scores of the plurality of existing ANN architectures on the existing datasets and the dataset pairwise similarities. A ninth step 290 includes calculating interpolation weights for the plurality of existing ANN architectures using the target performance scores of the existing ANN architectures on the target dataset and the centrality scores calculated using the ANN pairwise similarities. A tenth step 295 includes obtaining the custom ANN architecture by interpolating among the plurality of existing ANN architectures using the calculated interpolation weights.

As previously described, for an embodiment, calculating interpolation weights for the plurality of existing ANN architectures using the target performance scores of the existing ANN architectures on the target dataset and the centrality scores calculated using the ANN pairwise similarities includes calculating a product of an estimated performance score for each of the plurality of existing ANN architectures on the target dataset and a centrality score calculated using the pairwise similarities among the plurality of existing ANN architectures. For an embodiment, the centrality scores include at least one of an ANN closeness centrality, a degree centrality, a harmonic centrality, or other centrality.

As previously described, for an embodiment, calculating target performance scores for the plurality of existing ANN architectures on the target dataset using the performance scores of the plurality of existing ANN architectures on the known datasets and the dataset pairwise similarities includes interpolating among the performance scores of the plurality of existing ANN architectures on the existing datasets using the dataset pairwise similarities between the target dataset and each of the existing datasets. For an embodiment, calculating the dataset pairwise similarity between any two datasets of the target data set and the existing data set includes calculating convolutions of two dataset fingerprints of the any two datasets with a similarity metric. For an embodiment, calculating the dataset fingerprints includes calculating a fixed-length real number vectors by mapping the target dataset or any of the existing datasets onto a latent space of an existing ANN architecture pre-trained on one or more other datasets of a same type.

As previously described, for an embodiment, calculating ANN architecture pairwise similarities among the plurality of existing ANN architectures using the ANN architecture fingerprints comprises calculating convolutions of any two of the plurality of ANN architecture fingerprints with a similarity metric. For an embodiment, calculating a plurality of ANN architecture fingerprints including an ANN architecture fingerprint of each of the plurality of the existing ANN architectures comprises obtaining data structures that contains a complete description of an ANN topology and hyperparameters, wherein the ANN topology comprises a map of an ANN layer structure and pairwise connections among the ANN nodes.

For an embodiment, determining that the plurality of existing ANN architectures are the same type includes determining that the plurality of existing ANN architectures use as an input datasets of same type and perform inference tasks of a same type, and wherein determining that the plurality of existing dataset types are a same type as the target dataset comprises determining objects within the existing dataset types and the target dataset are of a same type and that mathematical descriptions of data points of the existing dataset types and the target dataset have a same format. For example, an Inception ANN architecture and a ResNet ANN architecture are of same type since they both use image datasets as input and perform multiclass classification as inference. Further, as previously described, for determining that the plurality of existing dataset types are a same type as the target dataset it is required that all objects described by the data points in a dataset are of a same type (e.g., audio recordings), the mathematical descriptions in all data points have same format (for example, one-dimensional time series of real numbers), and the sets of labels in all data points have same format (for example, a categorical label that defines a music genre). For example, an image dataset is a collection of data points, where each data point describes an image as an array of pixels and optionally a set of one or more labels, and each pixel is described by two coordinates that define its position within the image (usually but not necessarily the X and Y coordinates) and a set of base color intensities (usually but not necessarily RGB for red, green, and blue). For at least some embodiments datasets are considered to be of same type if they describe objects of same type and all data points therein include same format of mathematical description of the objects and same format of object labels. This definition makes it possible to merge two or more datasets of same type into a single dataset.

For an embodiment, the obtained performance scores of the existing ANN architectures provide a characterization of at least one of an accuracy, a computing speed, a memory size, or other characteristics of an inference calculation.

Figure 3:
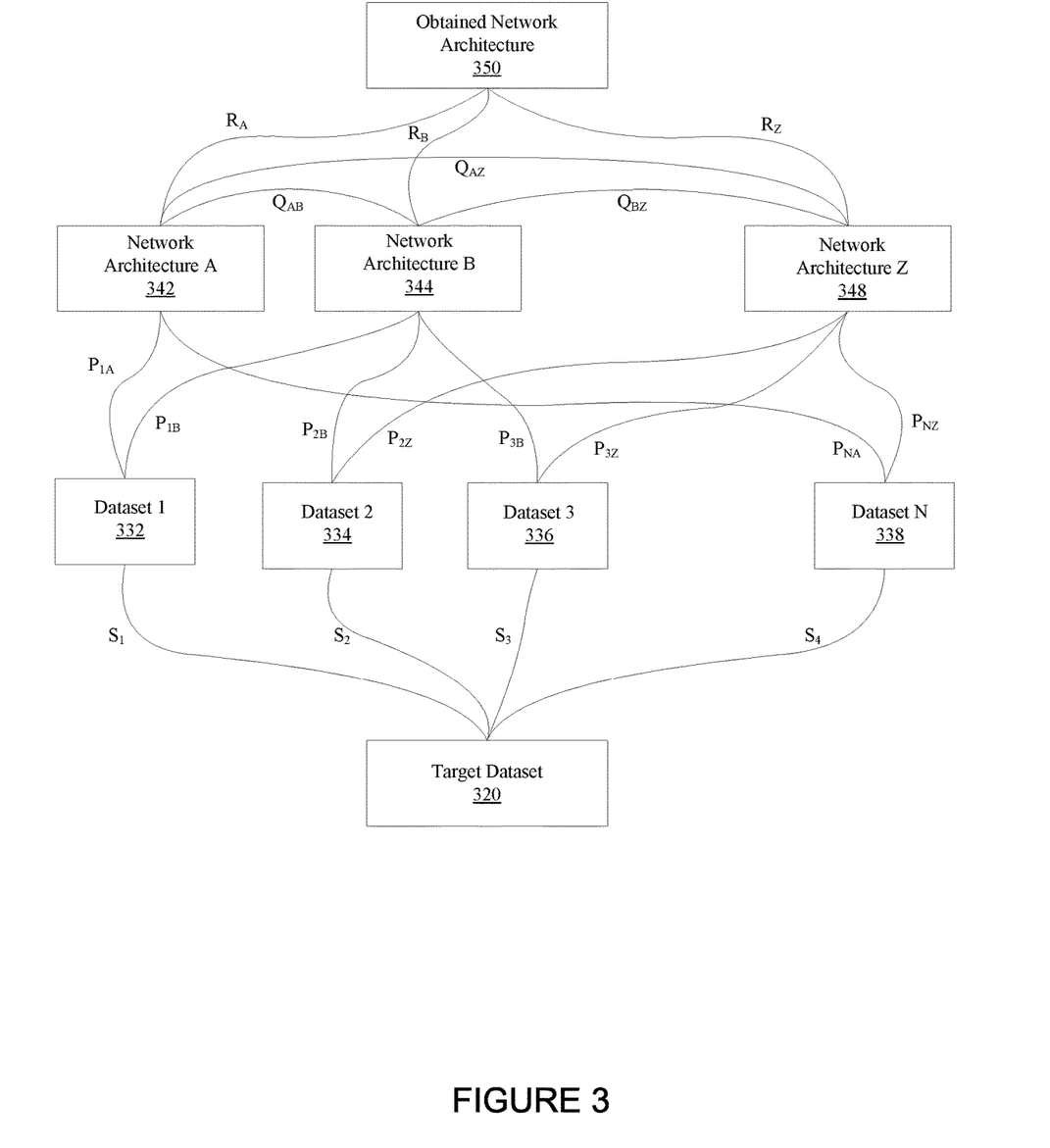
FIG. 3 shows a data flow for obtaining a custom artificial neural network (ANN) architecture, according to an embodiment.

FIG. 3 shows a data flow for obtaining a custom artificial neural network (ANN) architecture, according to an embodiment. For the target dataset 320 and each of the known datasets 332, 334, 336, . . . , 338 (datasets 1–N in FIG. 3), dataset fingerprints are calculated. Using these fingerprints, pairwise similarities $S_1, S_2, \ldots, S_N$ between the target dataset 320 and each of datasets 332, 334, 336, . . . , 338 are calculated. Known performance scores $P_{1A}, P_{1B}, \ldots, P_{1Z}, P_{2A}, P_{2B}, \ldots, P_{2Z}, \ldots, P_{NA}, P_{NB}, \ldots, P_{NZ}$ of ANN architectures 342, 344, . . . , 348 (ANN architectures A-Z in FIG. 3) on datasets 332, 334, 336, . . . , 338, along with the calculated pairwise similarities $S_1, S_2, \ldots, S_N$, are used to estimate the performance scores of these ANN architectures 342, 344, . . . , 348 on the target dataset $R_A, R_B, \ldots, R_Z$ without actually performing the calculations. Then, ANN architecture fingerprints are calculated for ANN architectures 342, 344, . . . , 348 and used to calculate pairwise similarities $Q_{AB}, \ldots, Q_{AZ}, \ldots, Q_{BZ}, \ldots$ among these ANN architectures 342, 344, . . . , 348. The similarities $Q_{AB}, \ldots, Q_{AZ}, \ldots, Q_{BZ}, \ldots$ are then used to calculate the closeness centrality, degree centrality, harmonic centrality, or other centrality scores for ANN architectures A-Z. Finally, the estimated performance scores $R_A, R_B, \ldots, R_Z$, along with the ANN architecture centrality scores, are used to obtain a custom ANN architecture 350 optimized for the target dataset and performance criteria.

Figure 4:
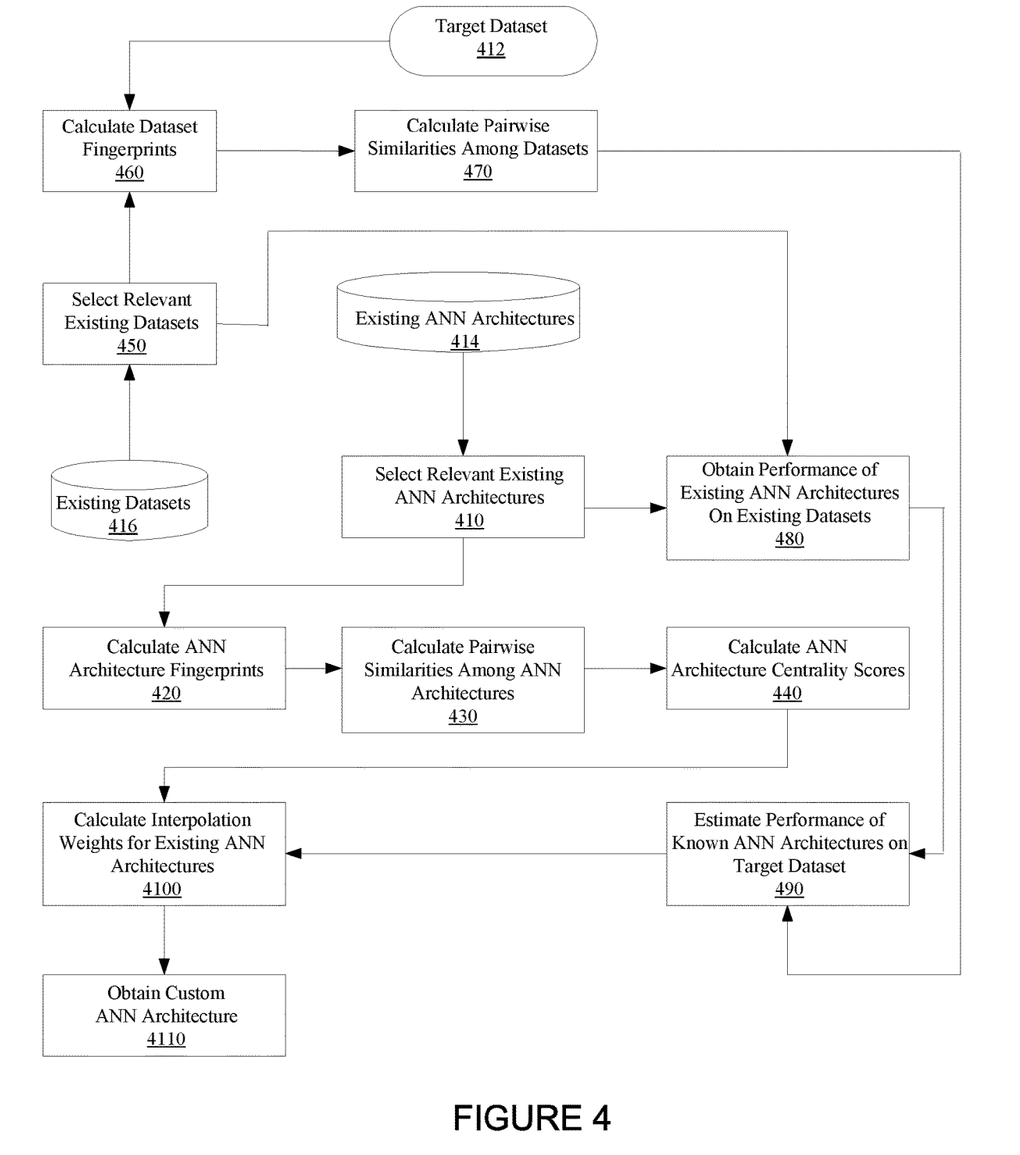
FIG. 4 shows a work flow for obtaining a custom artificial neural network (ANN) architecture, according to an embodiment.

FIG. 4 a work flow for obtaining a custom artificial neural network (ANN) architecture, according to an embodiment. As shown, for an embodiment, a step 410 includes selecting relevant existing ANN architectures. The selection can be made from a database 414 of existing ANN architectures.

A step 420 includes calculating ANN architecture fingerprints. For an embodiment, includes calculating ANN architecture fingerprints $G_A, G_B, \ldots, G_Z$ for known ANN architectures A-Z 414. ANN architecture fingerprints are data structures that contain the complete description of the ANN topology and hyperparameters but not weights or biases. For example, ANN architecture fingerprints can be implemented as hierarchical data structures similar to associated arrays, i.e., sets of key—value pairs where keys are alphanumeric strings and values are alphanumeric strings, scalars, lists, tensors, or nested sets of key-value pairs. ANN architecture fingerprints fully describe the ANN topology (the list of ANN layers with their parameters and connections among them) and hyperparameters (learning rate, optimizer type, used regularization techniques, and others).

A step 430 includes calculating pairwise similarities among ANN architectures. For an embodiment, includes calculating pairwise similarities $Q_{AB}, \ldots, Q_{AZ}, \ldots, Q_{BZ}, \ldots$ among known ANN architectures A-Z 414 using the ANN architecture fingerprints $G_A, G_B, \ldots, G_Z$ and similarity metrics for ANN architecture fingerprints. The pairwise similarities are real numbers that fall in the range from 0.0 to 1.0 that quantitatively characterize the extent to which one ANN architecture is similar to another. For example, a similarity metric can be a generalization of the cosine similarity that accounts for the hierarchical structure of the ANN architecture fingerprints and the different types of the ANN architecture fingerprints elements. For such a metric, the pairwise similarity between ANN architectures X and Y can be calculated as $Q_{XY} = \Sigma_{key} G_{X_{key}} G_{Y_{key}} / \sqrt{(\Sigma_{key} G_{X_{key}} G_{X_{key}})(\Sigma_{key} G_{Y_{key}} G_{Y_{key}})}$, where $G_X$ and $G_Y$ are the respective ANN architecture fingerprints, the sum index runs over the set of top level keys in $G_X$ and $G_Y$, respectively, and the products of elements $G_{X_{key}}$ and $G_{Y_{key}}$ are as previously described defined as follows:

- If the values $G_{X_{key}}$ and $G_{Y_{key}}$ in the two fingerprints for the same key are of different types (e.g., a tensor and a list of key-value pairs) or the value is missing in one of the fingerprints, the product is zero
- If the values $G_{X_{key}}$ and $G_{Y_{key}}$ in the two fingerprints for the same key are alphanumeric strings, the product is 1.0 if the strings are identical and 0.0 otherwise
- If the values $G_{X_{key}}$ and $G_{Y_{key}}$ in the two fingerprints for the same key are scalars, the product is $\sqrt{G_{X_{key}} G_{Y_{key}}}/(0.5(G_{X_{key}}+G_{Y_{key}}))$
- If the values $G_{X_{key}}$ and $G_{Y_{key}}$ in the two fingerprints for the same key are lists, the product is calculated using the cosine similarity
- If the values $G_{X_{key}}$ and $G_{Y_{key}}$ in the two fingerprints for the same key are tensors of the same order, the product is calculated using the cosine similarity and the both tensors reshaped to order 1 (1-dimensional lists). If the order of the two tensors is different, the product is zero.
- If the values $G_{X_{key}}$ and $G_{Y_{key}}$ in the two fingerprints for the same key are nested sets of key-value pairs, the product is calculated by recursively applying the above formula for $Q_{XY}$ to the nested sets.

A step 440 includes calculating ANN architecture centrality scores. For an embodiment, this includes estimating relative importance of the known ANN architectures A-Z using pairwise similarities $Q_{AB}, \ldots, Q_{AZ}, \ldots, Q_{BZ}, \ldots$ among them. For example, relative importance of the ANN architectures can be characterized by the closeness centrality, degree centrality, harmonic centrality, or other centrality scores $C_A, C_B, \ldots, C_Z$ for these ANN architectures. These centrality scores characterize, in multiple ways, how representative each ANN architecture is of the set of ANN architectures from which the centrality scores were calculated.

A step 450 includes selecting relevant existing datasets. For an embodiment, the existing dataset are retrieved from a database 416.

A step 460 includes calculating the dataset fingerprints from selected relevant existing datasets and a target data set 412. For an embodiment, this includes calculating dataset fingerprints $F_0$ for the target dataset 412 and $F_1, \ldots, F_N$ for the existing datasets 416. Dataset fingerprints are reduced representations of datasets that are used to quantitatively evaluate pairwise similarities between one dataset and another; because of the complex and diverse structure of the datasets, these similarities usually cannot be evaluated directly. Hereafter, dataset fingerprints are fixed-length real number vectors calculated by mapping each dataset onto a latent space of a known ANN pre-trained on one or more datasets of the same type. For example, a fingerprint of a computer vision dataset that includes images and image labels is a set of fixed-length vectors in the latent space of a convolutional ANN trained on another dataset that includes images and image labels. Alternatively, a fingerprint of a computer vision dataset that includes videos and video labels is a set of fixed-length vectors in the latent space of a generative ANN trained on another dataset that includes videos and video labels. For other types of datasets such as audio, text, or tabular data, datasets fingerprints are defined in the same way.

A step 470 includes calculating pairwise similarities among the datasets. For an embodiment, this includes calculating pairwise similarities $S_1, S_2, \ldots, S_N$ between the target dataset 412 and each known dataset of the known datasets 414. The similarities are calculated using the dataset fingerprints and a similarity metric such as cosine similarity or another. For example, using the cosine similarity metrics defines the pairwise similarities between datasets as follows:

$$S_i = \frac{\sum_{k=1}^{M} F_{0k} F_{ik}}{\sqrt{(\sum_{k=1}^{M} F_{0k} F_{0k})(\sum_{l=1}^{M} F_{il} F_{il})}}$$

where M is the fingerprint length, k and l are dataset element indexes, $F_0$ is the fingerprint of the target dataset, and $F_i$ is the fingerprint of the i-the known dataset. The above formula is a normalized dot product of the two dataset fingerprints. The calculated similarities are real numbers that fall in the range from 0.0 (datasets are as dissimilar as possible) to 1.0 (identical datasets). Importantly, although the dataset fingerprints are obtained by mapping the datasets onto the latent space of a pre-trained ANN and therefore depend on the choice of the ANN, the calculated similarities are qualitatively robust to the choice of the ANN.

A step 480 includes obtaining performances of existing ANN architectures on the existing datasets.

A step 490 includes estimating the performance of the known ANN architectures on the target dataset. For an embodiment, this calculating the estimated performance scores $R_A, R_B, \ldots, R_Z$ for existing ANN architectures 414 on the target dataset 412. If the target dataset 412 includes some true label values, these scores can be estimated directly by performing evaluation on the target dataset 412. Otherwise, the estimated performance scores can be obtained indirectly by means of interpolating among the known performance scores of the ANN architectures A-Z on the known datasets 1-N ($P_{1A}, P_{1B}, \ldots, P_{1Z}, P_{2A}, P_{2B}, \ldots, P_{2Z}, \ldots, P_{NA}, P_{NB}, \ldots, P_{NZ}$) using pairwise similarities between the target dataset and datasets 1-N($S_1, S_2, \ldots, S_N$) as weights. For example, the scores can be estimated using the weighted k nearest neighbor classifier) as follows:

$$R_X = \frac{\sum_{j=1}^{N} S_j P_{jX}}{\sum_{j=1}^{N} S_j}$$

where index j enumerates the known datasets 1-N.

A step 4100 includes calculating interpolation weights for the existing ANN architectures.

A step 4110 includes obtaining the custom ANN architecture. For an embodiment this includes calculating the custom ANN architecture for the target dataset using the estimated performance scores $R_A, R_B, \ldots, R_Z$ and the centrality scores $C_A, C_B, \ldots, C_Z$ for known ANN architectures A-Z. For example, the custom ANN architecture can be defined using polling among the known ANN architectures and selecting the architecture X that maximizes the product $C_X R_X$. Alternatively, numeric hyperparameters for the custom ANN can be obtained by interpolating using the weighted k nearest neighbor classifier as $G_{custom} = \sum_{i=A}^{Z} G_i C_i R_i / \sum_{i=A}^{Z} C_i R_i$. The custom ANN architecture can also be defined using a combination of the two methods, e.g., defining the ANN topology using polling.

As previously described, for an embodiment, the calculated interpolation weights are used for obtaining the ANN architecture fingerprint of the custom ANN architecture as a weighted sum of the ANN architecture fingerprints of the existing ANN architectures. For an embodiment, the custom ANN architecture is obtained from the ANN architecture fingerprint of the custom ANN architecture in a way that is inverse to calculating an ANN architecture fingerprint. Specifically, the custom ANN architecture is obtained by performing a weighted interpolation on the ANN architecture fingerprints of the known (relevant) ANN architectures to obtain an ANN architecture fingerprint of the custom ANN architecture. The custom ANN architecture is then reconstructed from the ANN architecture fingerprint of the custom ANN architecture. For at least some embodiments, this is a straightforward process since the ANN architecture fingerprints as described are human-readable descriptions of the ANN architecture.

Use Cases that Utilize Custom Artificial Neural Network (ANN) Architectures

Figure 5:
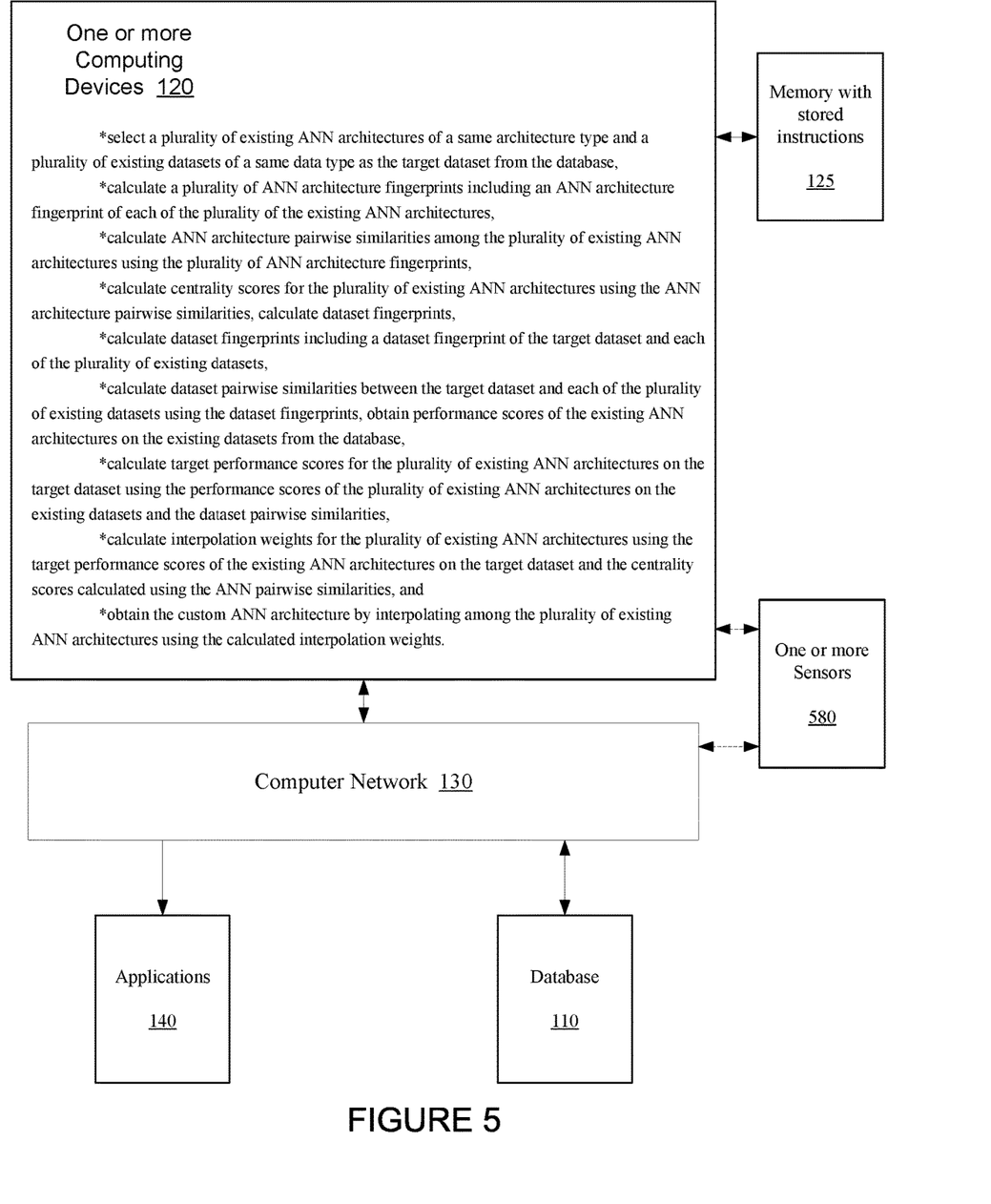
FIG. 5 shows, a system for obtaining a custom artificial neural network (ANN) architecture for performing an inference task on a target dataset with specified performance criteria, wherein one or more sensors operate to generate sensed data that the customer ANN architecture processes, according to an embodiment.

FIG. 5 shows, a system for obtaining a custom artificial neural network (ANN) architecture for performing an inference task on a target dataset with specified performance criteria, wherein one or more sensors 580 operate to generate sensed data that the customer ANN architecture processes, according to an embodiment. For an embodiment, the one or more sensors 580 operate to sense a physical parameter, such as, an image or audible sound. The sensed data can be stored in the database 110 or directly input to the one or more computing devices 120.

Computer Vision

For an embodiment, the one or more sensors 580 include at least one camera (such as, a video camera). For an embodiment, the one or more sensors 580 and the one or more computing devices 120 operate to stream video data to a computer vision ANN of the one or more computing devices 120 (or applications 140) that performs object detection, categorization, and tracking according to one or more of applications 140. For at least some embodiments, an autonomous driving car uses the video stream from a front-facing camera to detect, categorize, and track objects such as pedestrians, bicyclists, other vehicles (cars, trucks, buses, etc.). For an embodiment, the obtained object data is streamed to another ANN that performs reinforcement learning in order to, for example, control the autonomous driving car. Each of the ANNs can include one of the described custom artificial neural network (ANN) architectures.

Natural Language Processing

For another embodiment, the one or more sensors 580 include at least one microphone. For an embodiment, the one or more sensors 580 and the one or more computing devices 120 operate to stream audio data to a transformer ANN that converts speech into text. For an embodiment, the text is streamed to other ANN (natural language processor) that perform various natural language processing tasks, e.g. machine translation to another language followed by text-to-speech transformation in order to generate speech in another language. The transformer ANN and the other ANN operate to provide real-time machine translation (for example, as an application in a mobile phone). Each of the ANNs can include the described custom artificial neural network (ANN) architectures.

Chatbots

For at least some embodiments, the described embodiments for natural language processing additionally include comprehending the text, including, for example, machine translation, entity extraction, and sentiment identification. Such an embodiment can be utilized by chatbots that focus on conducting a meaningful dialog with humans (interpreting the text, extracting intent, and identifying and evaluating possible responses). For at least some embodiments, the one or more sensors 580 include one or more microphones that operate to stream audio data to an ANN that performs speech-to-text transformation and sends the text stream to another ANN that generates the response. The response, in turn, is streamed to yet another ANN that converts the response into speech. Each of the ANNs can include the described custom artificial neural network (ANN) architectures.

Although specific embodiments have been described and illustrated, the described embodiments are not to be limited to the specific forms or arrangements of parts so described and illustrated. The embodiments are limited only by the appended claims.

What is claimed:

1. A method for obtaining a custom artificial neural network (ANN) architecture for performing an inference task on a target dataset of a video data stream with specified performance criteria, comprising:
    selecting a plurality of existing ANN architectures of a same architecture type and a plurality of existing datasets of a same data type as the target dataset of the video stream of data;
    calculating a plurality of ANN architecture fingerprints including an ANN architecture fingerprint of each of the plurality of the existing ANN architectures;
    calculating ANN architecture pairwise similarities among the plurality of existing ANN architectures using the plurality of ANN architecture fingerprints;
    calculating centrality scores for the plurality of existing ANN architectures using the ANN architecture pairwise similarities;
    calculating dataset fingerprints including a dataset fingerprint of the target dataset and each of the plurality of existing datasets;
    calculating dataset pairwise similarities between the target dataset and each of the plurality of existing datasets using the dataset fingerprints;
    obtaining performance scores of the existing ANN architectures on the existing datasets;
    calculating target performance scores for the plurality of existing ANN architectures on the target dataset using the performance scores of the plurality of existing ANN architectures on the existing datasets and the dataset pairwise similarities;
    calculating interpolation weights for the plurality of existing ANN architectures using the target performance scores of the existing ANN architectures on the target dataset and the centrality scores calculated using the ANN pairwise similarities;
    obtaining the custom ANN architecture by interpolating among the plurality of existing ANN architectures using the calculated interpolation weights;
    sensing, by one or more cameras, the stream of video data;
    detecting, categorizing, and tracking, by the custom ANN architecture, objects within the stream of video data; and
    controlling an autonomous driving car based at least on the detected, categorized, and tracked objects.

2. The method of claim 1, wherein calculating interpolation weights for the plurality of existing ANN architectures using the target performance scores of the existing ANN architectures on the target dataset and the centrality scores calculated using the ANN pairwise similarities comprises calculating products of an estimated performance score for each of the plurality of existing ANN architectures on the target dataset and a centrality score for a same ANN architecture calculated using the pairwise similarities among the plurality of existing ANN architectures.

3. The method of claim 2, wherein the centrality scores includes at least one of an ANN closeness centrality, a degree centrality, or a harmonic centrality.

4. The method of claim 2, wherein calculating target performance scores for the plurality of existing ANN architectures on the target dataset using the performance scores of the plurality of existing ANN architectures on the known datasets and the dataset pairwise similarities comprises interpolating among the performance scores of the plurality of existing ANN architectures on the existing datasets using the dataset pairwise similarities between the target dataset and each of the existing datasets as weights.

5. The method of claim 4, wherein calculating the dataset pairwise similarity between any two datasets of the target data set and the existing data set comprises calculating convolutions of two dataset fingerprints of the any two datasets with a similarity metric.

6. The method of claim 5, wherein calculating the dataset fingerprints comprises calculating a fixed-length real number vectors by mapping a dataset of the target dataset or any of the existing datasets onto a latent space of an existing ANN architecture pre-trained on one or more other datasets of a same type.

7. The method of claim 1, wherein calculating ANN architecture pairwise similarities among the plurality of existing ANN architectures using the ANN architecture fingerprints comprises calculating convolutions of any two of the plurality of ANN architecture fingerprints with a similarity metric.

8. The method of claim 7, wherein calculating a plurality of ANN architecture fingerprints including an ANN architecture fingerprint of each of the plurality of the existing ANN architectures comprises obtaining data structures that contains a complete description of an ANN topology and hyperparameters, wherein the ANN topology comprises a map of an ANN layer structure and pairwise connections among nodes of the ANN layer structure.

9. The method of claim 1, further including determining that the plurality of existing ANN architectures are the same type comprising determining that the plurality of existing ANN architectures use as an input datasets of same type and perform inference tasks of a same type, and further including determining that the plurality of existing data types are a same type as the target dataset comprising determining objects within the existing dataset types and the target dataset are of a same type and that mathematical descriptions of data points of the existing dataset types and the target dataset have a same format.

10. The method of claim 1, wherein the obtained performance scores of the existing ANN architectures provide a characterization of at least one of an accuracy, a computing speed, a memory size, or other characteristics of an inference calculation.

11. A system of an autonomous car for obtaining a custom artificial neural network (ANN) architecture for performing an inference task on a target dataset of a video data stream with specified performance criteria, comprising:
one or more cameras configured to sense a stream of video data;
a database;
one or more computing devices connected through a network to the database,
memory including instructions that, when executed by the one or more computing devices, enables the system of the autonomous car to:

select a plurality of existing ANN architectures of a same architecture type and a plurality of existing datasets of a same data type as the target dataset of the video data stream from the database;
calculate a plurality of ANN architecture fingerprints including an ANN architecture fingerprint of each of the plurality of the existing ANN architectures;
calculate ANN architecture pairwise similarities among the plurality of existing ANN architectures using the plurality of ANN architecture fingerprints;
calculate centrality scores for the plurality of existing ANN architectures using the ANN architecture pairwise similarities;
calculate dataset fingerprints including a dataset fingerprint of the target dataset and each of the plurality of existing datasets;
calculate dataset pairwise similarities between the target dataset and each of the plurality of existing datasets using the dataset fingerprints;
obtain performance scores of the existing ANN architectures on the existing datasets from the database;
calculate target performance scores for the plurality of existing ANN architectures on the target dataset using the performance scores of the plurality of existing ANN architectures on the existing datasets and the dataset pairwise similarities;
calculate interpolation weights for the plurality of existing ANN architectures using the target performance scores of the existing ANN architectures on the target dataset and the centrality scores calculated using the ANN pairwise similarities; and
obtain the custom ANN architecture by interpolating among the plurality of existing ANN architectures using the calculated interpolation weights;
wherein the custom ANN architecture is configured to detect, categorize, and track, objects within the stream of video data; and
wherein the instructions when executed by the one or more computing devices further enables the system of the autonomous car to control the autonomous driving car based at least on the detected, categorized, and tracked objects.

12. The system of claim 11, wherein calculating interpolation weights for the plurality of existing ANN architectures using the target performance scores of the existing ANN architectures on the target dataset and the centrality scores calculated using the ANN pairwise similarities comprises calculating products of an estimated performance score for each of the plurality of existing ANN architectures on the target dataset and a centrality score for the same ANN architecture calculated using the pairwise similarities among the plurality of existing ANN architectures.

13. The system of claim 12, wherein the centrality scores includes at least one of an ANN closeness centrality, a degree centrality, or a harmonic centrality.

14. The system of claim 12, wherein calculating target performance scores for the plurality of existing ANN architectures on the target dataset using the performance scores of the plurality of existing ANN architectures on the known datasets and the dataset pairwise similarities comprises interpolating among the performance scores of the plurality of existing ANN architectures on the existing datasets using the dataset pairwise similarities between the target dataset and each of the existing datasets as weights.

15. The system of claim 14, wherein calculating the dataset pairwise similarity between any two datasets of the target data set and the existing data set comprises calculating convolutions of two dataset fingerprints of the any two datasets with a similarity metric.

16. The system of claim 15, wherein calculating the dataset fingerprints comprises calculating a fixed-length real number vectors by mapping a dataset of the target dataset or anyone of the existing data sets onto a latent space of an existing ANN architecture pre-trained on one or more other datasets of a same type.

17. The system of claim 11, wherein calculating ANN architecture pairwise similarities among the plurality of existing ANN architectures using the ANN architecture fingerprints comprises calculating convolutions of any two of the plurality of ANN architecture fingerprints with a similarity metric.

18. The system of claim 17, wherein calculating a plurality of ANN architecture fingerprints including an ANN architecture fingerprint of each of the plurality of the existing ANN architectures comprises obtaining data structures that contains a complete description of an ANN topology, and hyperparameters, wherein the ANN topology comprises a map of an ANN layer structure and pairwise connections among the ANN nodes.

19. The system of claim 11, wherein execution by the one or more computing devices, further enables the system to:

determine that the plurality of existing ANN further including determining that the plurality of existing ANN architectures are the same type comprising determining that the plurality of existing ANN architectures use as an input datasets of same type and perform inference tasks of a same type; and determine that the plurality of existing data types is a same type as the target dataset comprising determining objects within the existing dataset types and the target dataset are of a same type and that mathematical descriptions of data points of the existing dataset types and the target dataset have a same format.

20. The system of claim 11, wherein the obtained performance scores of the existing ANN architectures provide a characterization of at least one of an accuracy, a computing speed, a memory size, or other characteristics of an inference calculation.

\* \* \* \* \*